Feb. 28, 1961 J. J. TAYLOR 2,973,403

TRANSMISSION LINE SPACER

Original Filed June 11, 1956 4 Sheets-Sheet 1

*INVENTOR.*

John J. Taylor.

*BY* Kenneth W. Miller

ATTORNEY.

TRANSMISSION LINE SPACER

Original Filed June 11, 1956

INVENTOR.
John J. Taylor.
BY
Kenneth W. Miller
ATTORNEY.

TRANSMISSION LINE SPACER

Original Filed June 11, 1956

INVENTOR.
John J. Taylor.
BY Kenneth W. Miller
ATTORNEY.

Feb. 28, 1961 J. J. TAYLOR 2,973,403

TRANSMISSION LINE SPACER

Original Filed June 11, 1956 4 Sheets-Sheet 4

INVENTOR.
John J. Taylor.
BY
Kenneth W. Miller
ATTORNEY.

United States Patent Office 2,973,403 Patented Feb. 28, 1961

2,973,403

TRANSMISSION LINE SPACER

John J. Taylor, Medina, Ohio, assignor to The Ohio Brass Company, Mansfield, Ohio, a corporation of New Jersey Continuation of application Ser. No. 590,661, June 11, 1956. This application Sept. 8, 1958, Ser. No. 759,823

2 Claims. (Cl. 174—40)

This invention relates to high voltage transmission lines and more particularly to transmission lines having bundled conductors.

This application incorporates matter originally disclosed and claimed in my application Serial Number 590,661, filed June 11, 1956, now abandoned and entitled "Transmission Apparatus and Conductor Spacers Therefor," and this application is a continuation thereof.

In the art pertaining to the transmission of electrical energy from a generator to a remote load or distribution center, the use of very high voltages has become increasingly practicable because of the increased knowledge of the apparatus requirements of such lines on the part of those concerned therewith. Whereas, heretofore, transmission lines employing voltages in the order of 250,000 volts were considered to be very high voltage lines, more recently engineering planning and design has been directed toward the employment of transmission voltages of 330,000 volts and upwards.

The ability to employ such high transmission voltages has, in a large part, been due to increased knowledge of corona effects at the suspension apparatus. This has led to improved design of the suspension apparatus as well as the utilization of auxiliary apparatus, such as control rings, to reduce corona effects. As a result, the limiting factor as regards the use of still higher voltages, has been the corona effects associated with the conductors themselves.

In order to avoid corona effects about the conductors, arrangements have been proposed and are in use in which the so-called bundled conductors are employed. In such arrangements, the conductor of each phase of the transmission line is not a single cable, but a plurality of such cables, held apart by appropriate means known as spacers, but which are electrically one and constitute a single conductor for the phase current.

The use of such conductors presents numerous problems which have not heretofore been satisfactorily overcome. In particular, the spacers must hold the individual cables apart, yet must provide a certain amount of freedom for the cables in order to accommodate vibration conditions, ice unloading, and the like.

The present invention is concerned with a novel arrangement of cables and spacers in such a bundled conductor system and has certain unique advantages which have not heretofore been achieved in the art. Particularly, I have conceived that the use of a spacer, which will prevent torsional rotation of the cables in the span while permitting a certain amount of relative longitudinal movement, has substantial advantages when utilized in conjunction with a so-called flexible spacer, which imparts a resistance to relative longitudinal movement of the conductors together with a restoring force for returning the cables to their original position.

In particular, I utilize a plurality of the first described spacers along the span of a transmission line between the towers and the second described spacers at the suspension points at the towers. It is a feature of such an arrangement that the spacers which are inherently least apt to fail or may be designed to reduce the probability of such failure are placed along the span, whereas, the spacers which have a greater inherent tendency to fail, or are less subject to design, are placed in positions at the towers where they are relatively accessible for purposes of servicing and replacement.

Accordingly, a principal object of the invention is to increase the voltage capabilities of high voltage transmission lines.

Another general object of the invention is to provide a bundled conductor arrangement for high voltage transmission lines which is particularly adapted to withstand the conditions of practical employment and use.

Still another object of the invention is to minimize cable failure in bundled conductor systems.

Still another object of the invention is to provide improved spacers for use in bundled conductor systems.

The invention will be more clearly understood with reference to the following detailed specification and claims taken in connection with the appended drawings, in which:

Figure 1:
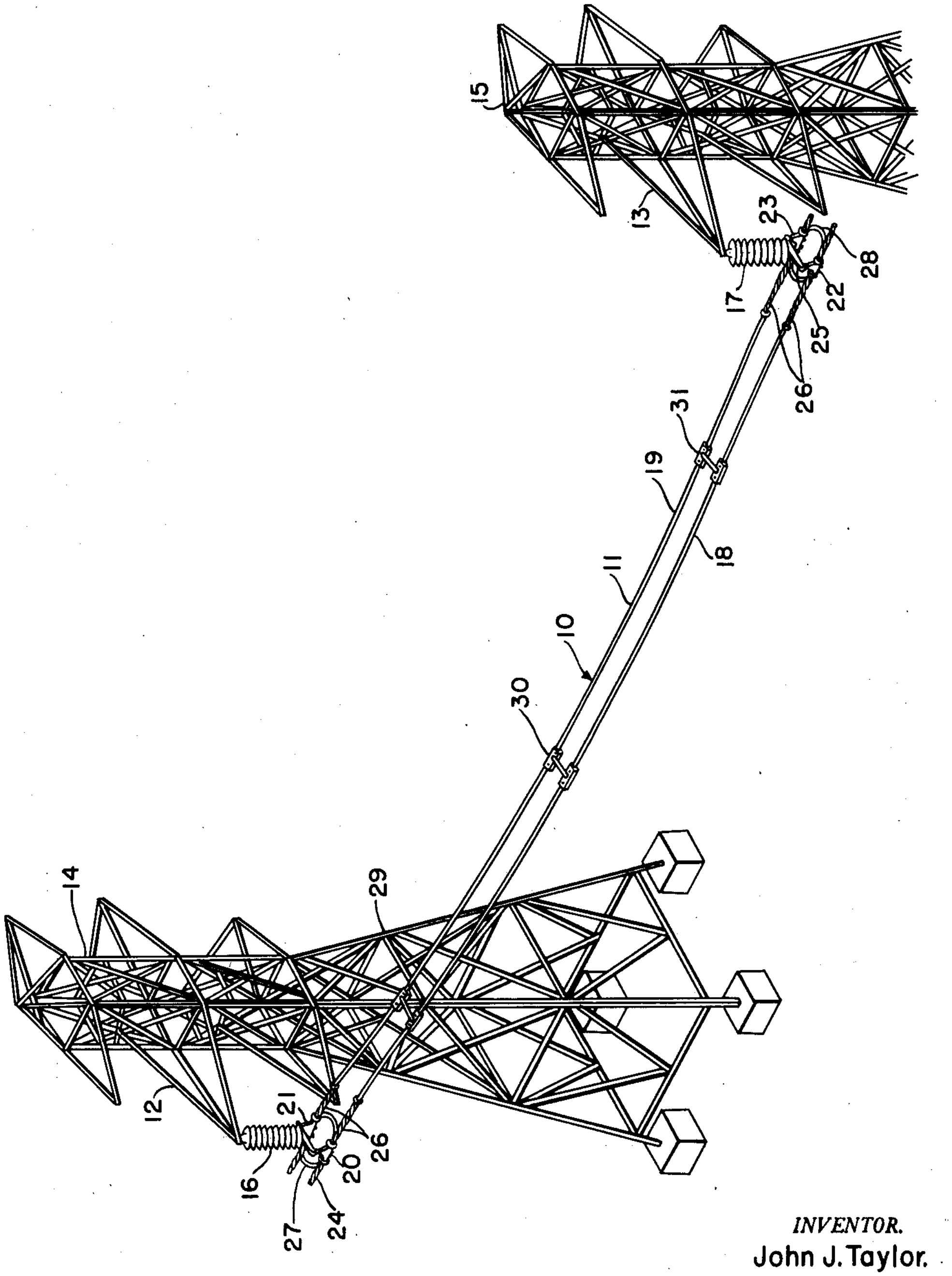
Fig. 1 is a perspective view of a span of a transmission line embodying the invention and showing a phase conductor of the line arranged as a so-called bundle conductor.

Referring now to Fig. 1, there is shown a span of a high voltage transmission line 10 constructed in accordance with the invention. As there shown, a phase conductor 11 is supported from the arms 12 and 13 of towers 14 and 15 by means of suspension insulators 16 and 17. The phase conductor 11 is constituted by two cables 18 and 19 which are held by conductor clamps 20 and 21 and 22 and 23 carried by bridles 24 and 25, respectively. The bridles 24 and 25 are suspended from insulators 16 and 17 by ball and socket connectors or similar pivotal arrangements. The insulators 16 and 17 constitute strings of suspension insulators in accordance with customary high voltage transmission line practice.

The cables 18 and 19 are provided at the suspension points, e.g., at the suspension clamps 20, 21, 22 and 23, with armor rods 26. The armor rods 26 need not necessarily be employed, but have certain advantages in connection with the practice of the present invention, as will appear hereinafter.

In accordance with the invention, the cables 18 and 19 are held in laterally spaced relationship by appropriate spacers at various positions along the span and at the suspension points at the towers. The spacers 27 and 28 at the suspension points are arranged to prevent or resist relative longitudinal movement of the separate cables of the bundled conductors and to provide a restoring force which tends to return the cables to their normal position if such displacement is brought about for any reason. The spacers 29, 30 and 31 are disposed along the span and provide relative torsional rigidity of the cables, while permitting relative longitudinal movement thereof. In each instance, the spacers perform principally a mechanical function in preserving a desired mechanical orientation of the cables although they serve also a subsidiary function of maintaining an electrical connection between the cables so that the cables function electrically as a single conductor.

Figure 2:
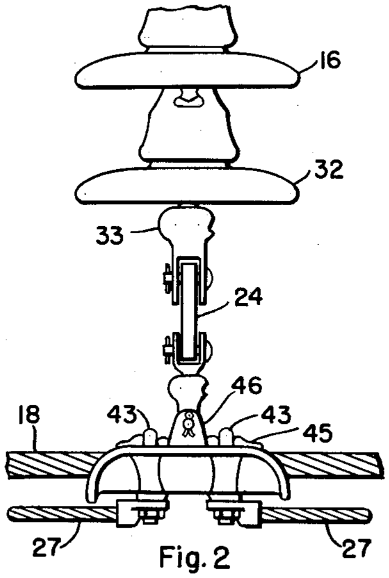
Fig. 2 is an enlarged side elevation view showing the suspension insulators, bridle, conductor clamps, and spacer of Fig. 1.
Figure 3:
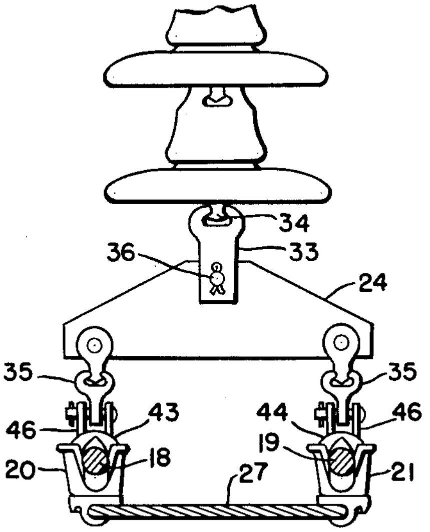
Fig. 3 is an end elevation view corresponding to Fig. 2.

Referring now to Figs. 2 and 3, the bridle 24 is suspended from a bottom suspension insulator 32 of the insulator string 16 by means of a ball and socket connector including a socket member 33 and a ball member 34. The suspension clamps 20 and 21 are attached to ends of the bridle 24 also by means of ball and socket connectors 35. The ball and socket connectors are pivoted transversely upon the bridle and the conductor clamps longitudinally upon the ball and socket connectors by clevis and pin arrangements. The entire arrangement is such that the cables 18 and 19 and suspension clamps 20 and 21 have a measure of lateral freedom with respect each to the other because of the connectors 35, while the entire assemblage may pivot upon the clevis pin 36 of the socket member 33 or pivot about the ball 34.

Figure 4:
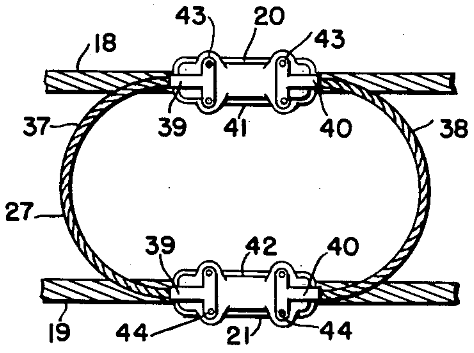
Fig. 4 is a bottom view showing the conductor spacer of Figs. 2 and 3.

The spacer 27 incorporates, in the particular construction shown in Fig. 4, two half loop members 37 and 38, each comprising a length of cable or the like and provided with terminal members 39 and 40 at the ends thereof. The terminal members 39 and 40 are held against the body parts 41 and 42 of the suspension clamps 20 and 21, respectively, by means of the U-bolts 43 and 44 which hold the keeper parts 45 in clamping relationship against the cable.

The half loop members 37 and 38 are each formed of a piece of cable in which a plurality of spring steel wires are twisted spirally about a core to provide a naturally resilient element. The particular size, tensile strength, resilience, and the like of the cables will, of course, be determined by the design of the particular transmission line and the range of climatic and other conditions which will be encountered. The terminal members 39 and 40 constitute one piece T-shape members having a socket at the end of the center part for receiving the end of the loop cable and two openings at the ends of the cross part for receiving the U-bolts. The center part of the terminal member is compressed upon the cable to form a mechanical joint therewith.

The body parts 41 and 42 of the suspension clamps 20 and 21 are formed with longitudinal grooves for supporting the cable with bosses on the underside for engagement by the terminal members 39 and 40. The keeper and suspension means 46 for the conductor clamps are in accordance with usual transmission clamp practice.

Figure 5:
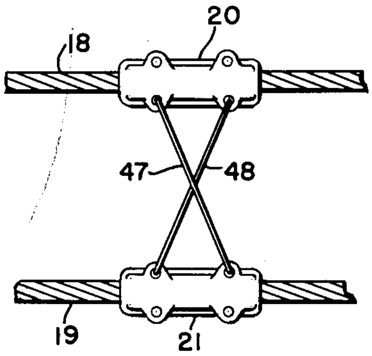
Fig. 5 shows the construction of a spacer which may be utilized as a substitute for the spacer of Figs. 2, 3 and 4 under certain circumstances.

In the arrangement of Fig. 5, there is substituted for the flexible half loops 37 and 38, two rigid cross bars 47 and 48 which are received over the U-bolts of the suspension clamps 20 and 21. The bars 47 and 48 are crossed to hold the suspension clamps rigidly and thereby prevent relative lateral movement of the suspension clamps and cables, as well as relative longitudinal movement by reason of the movement of the individual cables in a longitudinal direction with respect to the ball 34. The arrangement of Fig. 5 is particularly suitable for use in those circumstances where a relatively rigid connection between the cables is required and represents an extreme form of the spacer of Fig. 4.

Figure 6:
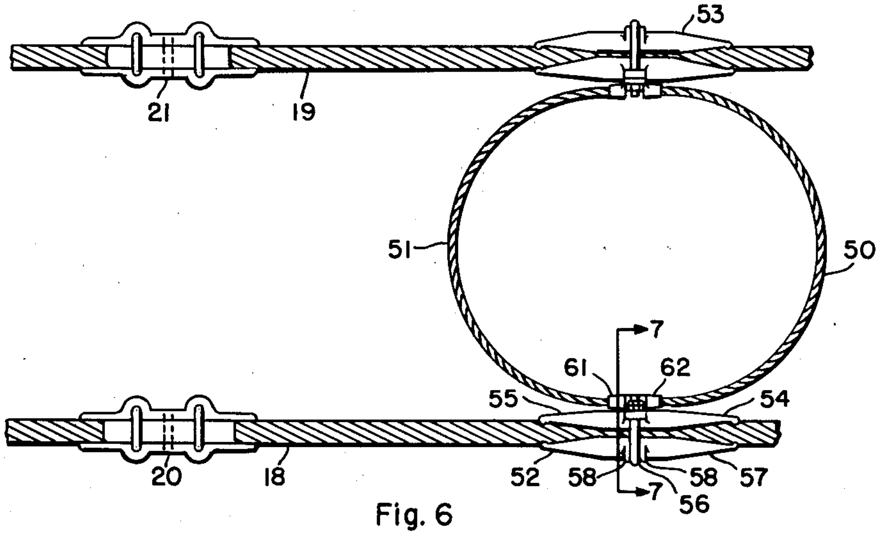
Fig. 6 shows an alternate construction of the flexible spacer of Fig. 4 and an alternate arrangement of the spacer with the cables and conductor clamps at the suspension insulator.
Figure 7:
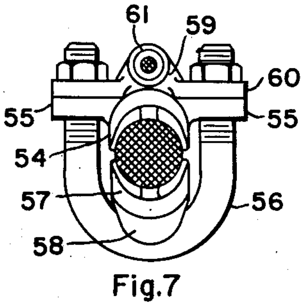
Fig. 7 is a section view of a portion of the spacer and cable of Fig. 6 taken in the direction 7—7 in Fig. 6.

Referring now to Figs. 6 and 7, the flexible spacer 50 shown therein comprises a continuous loop spacer member 51 with two conductor clamps 52 and 53. The clamps 52 and 53 are indentically formed having, as for example in the clamp 52, an inner clamp member 54 which is provided with projecting ear parts 55 for receiving a U-bolt 56 and an outer clamp member 57 having ridges 58 for positioning the member with respect to the U-bolt 56. The clamp members 54 and 57 are preferably of elongated construction, as shown in Fig. 6, with the thickness and rigidity of the members diminishing outwardly from the center of the member, as set forth and described in my pending application, Serial No. 590,662, filed June 11, 1956. Such arrangement is not essential to the practice of the present invention, however, and the cable clamps may be simple rigid members with appropriate grooves for receiving the cables.

The terminal member 59 comprises an integral double-T-member having a cross part 60 for cooperation with the ears 55 of the clamp member 54, the clamp member 54 and the U-bolt 56, and two oppositely directed socket parts 61 and 62. The spacer member 51 extends through the member 59 and the parts 61 and 62 are compressed upon a cable to form a rigid joint.

The spacer member 51 is formed in an endless piece and comprises a single wire wound upon itself to form a multiple strand cable. Alternately, separate lengths of cable may be utilized to form the half loops, after the fashion of the spacer 27, but with the ends of the cable lengths held by the socket parts of the terminal members.

As shown in Fig. 6, the spacer 50 is clamped to the cables 18 and 19 at a position adjacent the cable clamps 20 and 21. The arrangement is useful whether or not the cables are provided with the armor rods shown in Fig. 1, inasmuch as in the absence of armor rods, the resilient construction of the clamps 52 and 53 tends to prevent cable fatigue and breakage. Also, the spacer 50 may be positioned closely adjacent the conductor clamps 21 and 22 or relatively distant, as shown in Fig. 6, depending upon the particular construction, vibration conditions. etc.

Figure 8:
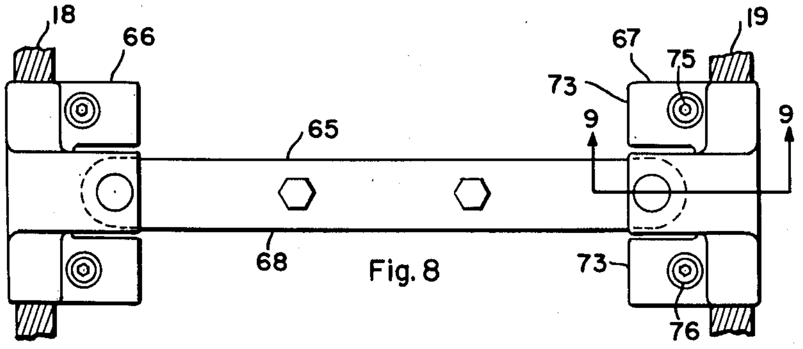
Figs. 8 and 9 show a spacer of the invention for use along the span of the transmission line.
Figure 9:
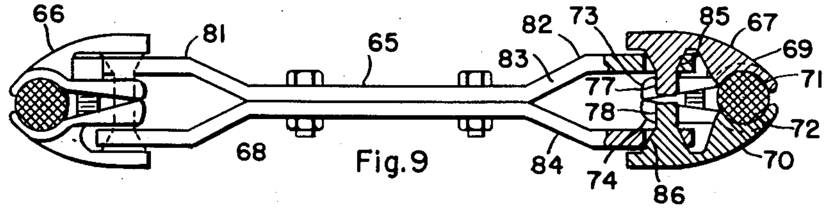

Figs. 8 to 13, inclusive, illustrate various embodiments of torsionally restrained spacers for use as the spacers 29, 30 and 31 along the span of the transmission line. In Figs. 8 and 9, the spacer 65 comprises two conductor clamps 66 and 67 with a spacer bar 68. As shown for the conductor clamp 67, each of the conductor clamps comprises two similar metallic body members 69 and 70 having arcuate longitudinally opposed grooves 71 and 72 for receiving and engaging the conductor cable. The body members 69 and 70 have, at the outer ends, inwardly directed parts 73 and 74 which are engaged at the transverse inner extremities thereof to form a pivot for the body members. Two clamping screws 75 and 76 serve to draw the body members together in clamping engagement with the cable. The central parts of the two members are spaced apart in a vertical direction and carry two inwardly directed studs 77 and 78 having opposed conical portions 79 and 80. The studs may be integral with the body members, as shown, or separate pieces.

The spacer bar 68 comprises two flat metal pieces bolted together along the central part to form a single piece spread at the ends to form two bifurcated end parts 81 and 82. The arms of the end portions have aligned openings and are received over the inwardly projecting studs in the central parts of the conductor clamps. Thus, the arms 83 and 84 of the end 82 have aligned openings 85 and 86 received over the studs 77 and 78 and engage the conical surfaces 79 and 80 of the studs. The outer parts of the openings 85 and 86 are tapered to conform to the conical surfaces 79 and 80. The end parts of the bar are deformed from their natural position when placed over the studs so that the arms are in compressive elastic engagement with the surfaces 79 and 80.

According to the invention, the spacer of Figs. 8 and 9 accomplishes two functions. First, with the conductor clamps 66 and 67 in clamping engagement with the cables of the conductor system, such as the conductors 18 and 19 of Fig. 1, relative rotation of the cables is prevented because of the circumferential rigidity of a spacer about the longitudinal axis through the cable. Further, the bifurcate construction at the end of the spacer bar 68 is such that the relation is maintained for long periods.

Wearing motion of the members, because of turning movements in the cables, is minimized but any resultant wear is compensated for by the springing action of the arms of the spacer. Because of the pivoting action of the spacer with respect to the conductor clamps, the cables are free to move relative to each other in their longitudinal direction, but the static friction produced by the engagement of the arms 83 and 84 with the conical surfaces 79 and 80 of the studs, tends to resist and dissipate that movement.

Figure 10:
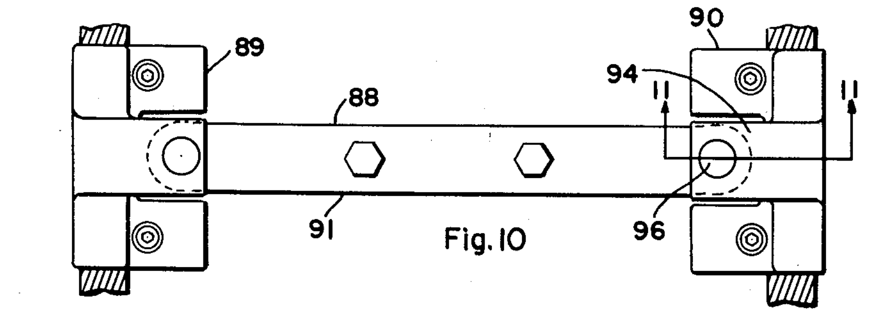
Figs. 10 and 11 show another spacer of the invention, somewhat similar to the spacer of Figs. 8 and 9, but embodying a different means for producing static friction between the parts.
Figure 11:
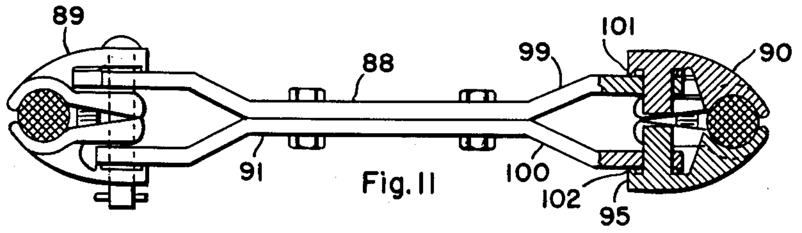

In the spacer of Figs. 10 and 11, the spacer 88 is generally similar to the spacer 65 of Figs. 8 and 9, comprising two conductor clamps 89 and 90 and spacer bar 91 having bifurcated ends. The conductor clamps are provided, however, as shown for the clamp 90, with openings 92 and 93 in the central parts 94 and 95 to receive a pin 96 which passes through the openings 97 and 98 in the arms and the openings 99 and 100 of the spacer bar. The central parts 94 and 95 are, moreover, provided with inwardly directed annular bearing parts 101 and 102 which engage the outer surfaces of the arms 99 and 100.

The engagement of the bearing parts 101 and 102 with the spacer arms provides a measure of static friction which resists relative turning of the cable clamps with respect to the spacer bar and tends to hinder relative longitudinal movement of the two cables. The amount of static friction thus obtained is substantial and the actual resisting force for a given design is closely predictable.

Figure 12:
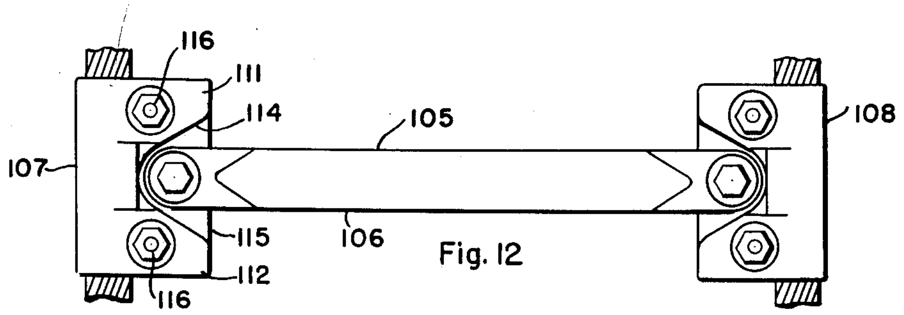
Figs. 12 and 13 show another spacer for use along the span of a transmission line.
Figure 13:
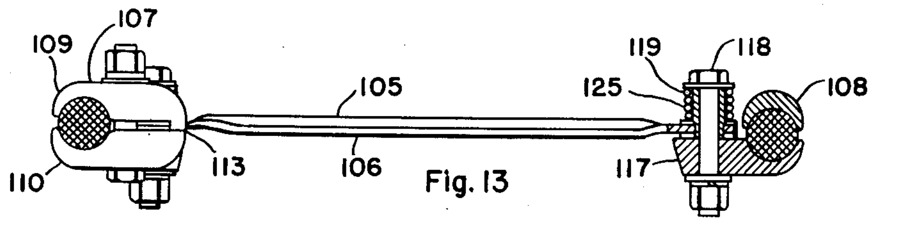

The spacer of Figs. 12 and 13 constitutes an improvement upon known spacers, for use in the arrangement of the present invention, as set forth above. The spacer 105 constitutes a rigid spacer bar 106 having conductor clamps 107 and 108 pivoted on the ends thereof. Each of the clamps is formed as two body parts, e.g., as the body parts 109 and 110 of the clamp 107. The body part 109 has two end parts 111 and 112 with pivotal projections 113 and a transversely recessed central part 114, while the body part 110 has a uniform rectangular lower part 115. The two body parts are held in compressive relationship by two clamping screws 116. The spacer bar 106 is formed of a flat metal bar having the center part twisted with respect to the end parts to increase the resistance to bending movements.

Figure 14:
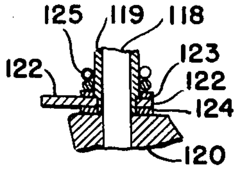
Fig. 14 is an enlarged section view showing the construction of the spacer of Figs. 12 and 13.

As shown particularly in Figs. 13 and 14, the spacer bar 106 is pivoted upon the lower body part, e.g., the body part 117 of clamp 108, by means of a bolt 118. The bolt 118 carries a bushing 119 which has a reduced lower end part 120 received in an opening 121 in the flat end part 122 of the spacer bar 106, and is held rigidly against the body part 117 by the bolt 118. The end part 122 of the spacer bar is held between two washers 123 and 124 by a spring 125 which bears upon the washer 123. The arrangement is such that the bushing 119 holds the conductor clamp and spacer bar against relative flexing in a transverse vertical plane, while the spring 125 and the washers 123 and 124 exercise a further restraint, providing a suitable static frictional force resisting relative turning of the spacer bar with respect to the conductor clamp in a horizontal plane.

The use of the spacers shown in Figs. 6 to 13, inclusive, in an arrangement such as that of Fig. 1, provides certain beneficial results not heretofore attained in the art. In the absence of resistance to the relative longitudinal movement of the cables, great strain is placed on the span spacers, e.g., the spacers 29, 30 and 31, and the pivot of the spacer must accommodate turning through very large angles, e.g., upwards of 170°. Sharp bending stresses at the departure of the cable from the conductor clamp of the spacer necessarily results and extreme tensile stresses are imposed upon the cable strands. Such movements result, for example, in ice unloading where the unloading is invariably non-uniform so that strong differential movements are produced.

Spacer constructions of Figs. 8 to 13 are of such inherent strength that the spacer will not be broken even under the worst ice unloading or other conditions so that any failure which is incurred will take place at the towers where replacement is a relatively simple procedure.

Other features of the arrangement set forth herein are of importance, e.g., the prevention of separate rotation of the cable within the span prevents the cables from becoming entwined. Also, the particular construction of the spacers of Figs. 9 to 11, inclusive, is such as to provide good current paths between the cables.

It is to be understood that the foregoing description is not intended to restrict the scope of the invention and that various rearrangements of the parts and modifications of the design may be resorted to, giving effect to a liberal interpretation to the claims as herein set forth.

I claim:

1. A combined conductor suspension means and flexible spacer for use with two conductor cables including two conductor clamps each comprising a clamp body having a longitudinal cable receiving groove and an open top, vertical openings at each side of the groove, a keeper disposed in the open part of the groove, clamping means passing over the keeper and downwardly through the openings, a flexible spacer comprising an elastically deformable member with a terminal member at each end thereof received over the clamping means of each conductor means and screw means on the clamping means for holding the clamp body, the keeper, and the spacer in compressive relation with each other and with the cables.

2. A combined conductor suspension means and flexible spacer for use with two conductor cables including two conductor clamps each comprising a clamp body having a longitudinal cable receiving groove and an open top, vertical openings at each side of the groove with bosses on the underside of the body about the openings, a keeper disposed in the open part of the groove, two U-bolts passing over the keeper and downwardly through the openings and projecting beyond the bosses, and screw means threaded on the ends of each of the U-bolts, and a laterally disposed flexible spacer comprising a loop-shaped elastically deformable member with a T-shaped terminal member attached to the deformable member at the lateral extremities thereof with the cross part of the terminal member perpendicular to the deformable member received over the ends of the U-bolts and under the screw means in clamping engagement with the underside of the clamp body and the bosses for holding the extremities of the loop shaped member in alignment with the cable receiving grooves of the clamps.

References Cited in the file of this patent

FOREIGN PATENTS

| | | |
|---|---|---|
| 724,729 | Great Britain | Feb. 23, 1955 |
| 1,103,932 | France | June 1, 1955 |
| 739,796 | Great Britain | Nov. 2, 1955 |
| 183,810 | Austria | Nov. 25, 1955 |